M. B. BOYCE.
UTOGRAPHIC ATTACHMENT FOR CAMERAS.
APPLICATION FILED MAY 14, 1919.

1,342,155.

Patented June 1, 1920.
2 SHEETS—SHEET 1.

WITNESSES

INVENTOR
M. B. Boyce,
BY
ATTORNEYS

M. B. BOYCE.
AUTOGRAPHIC ATTACHMENT FOR CAMERAS.
APPLICATION FILED MAY 14, 1919.
1,342,155.
Patented June 1, 1920.
2 SHEETS—SHEET 2.
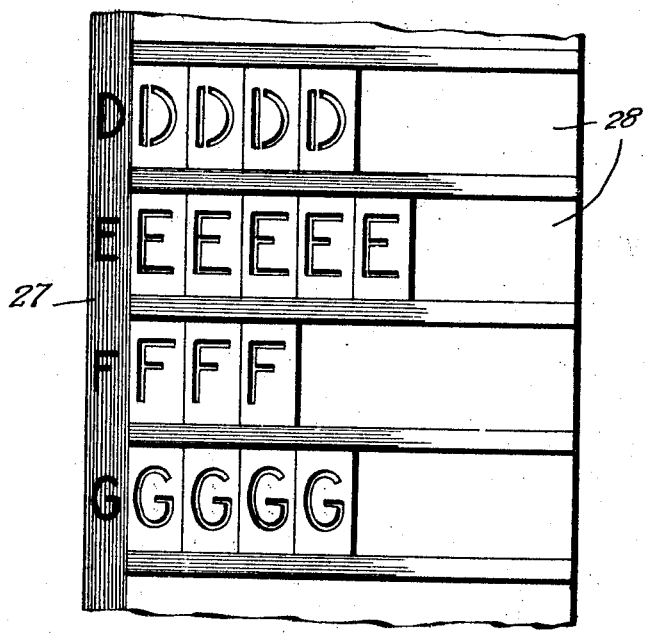
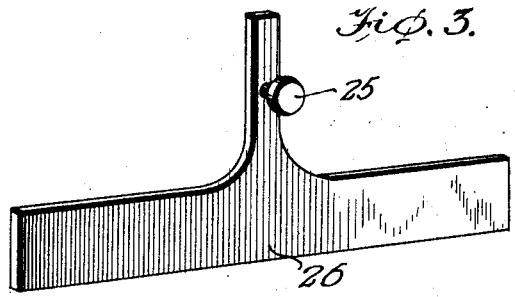
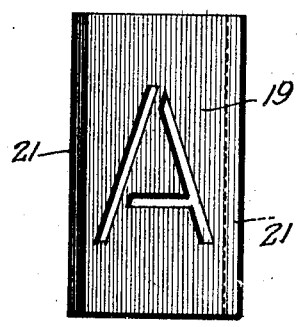
WITNESSES
INVENTOR
M. B. Boyce,
BY
ATTORNEYS

UNITED STATES PATENT OFFICE.

MALCOLM BOYD BOYCE, OF HAVERHILL, MASSACHUSETTS.

AUTOGRAPHIC ATTACHMENT FOR CAMERAS.

1,342,155.  Specification of Letters Patent.  Patented June 1, 1920.

Application filed May 14, 1919. Serial No. 297,019.

*To all whom it may concern:*

Be it known that I, MALCOLM B. BOYCE, a citizen of the United States, and a resident of Haverhill, in the county of Essex and State of Massachusetts, have invented certain new and useful Improvements in Autographic Attachments for Cameras, of which the following is a specification.

My present invention relates generally to cameras and more particularly to autographic cameras, my object being the provision of simple and inexpensive means in connection with cameras whereby to produce even, legible exposure titles and similar or allied data upon negatives, capable of ready manipulation, and uniform exposure and results.

The autographic devices now in common use depend upon handwriting made through the use of a stylus, and are often illegible either through careless writing or the inability to properly gage the necessary time of exposure. This latter case often occurs as the exposure time for fine hand-drawn lines must be comparatively exact.

My invention produces uniformly successful results, takes but little longer to accomplish such results and needs but a simple attachment to the camera for its purpose.

Figure 1:
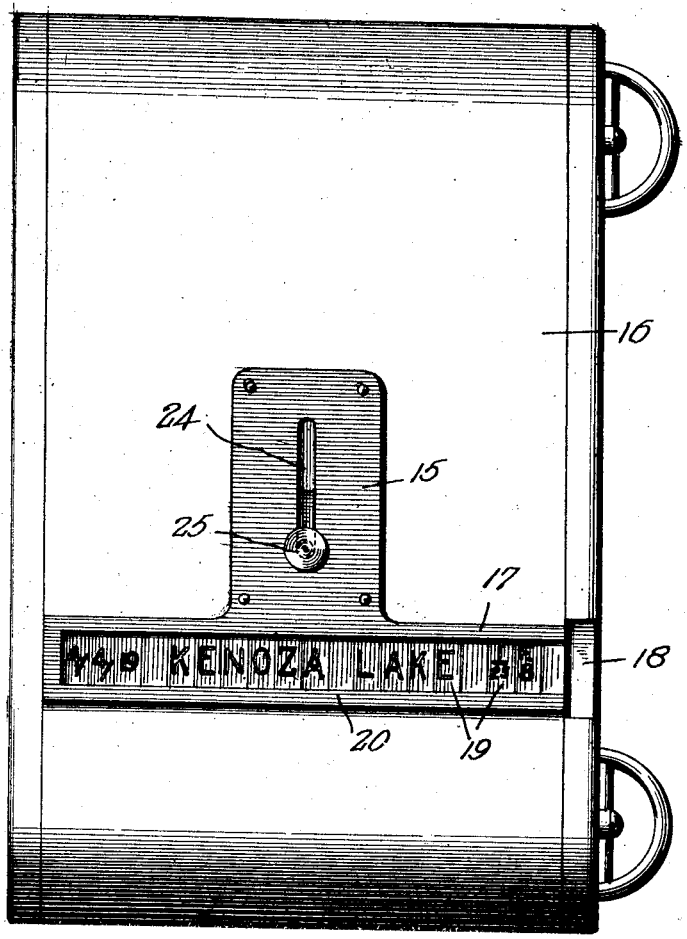
Figure 2:
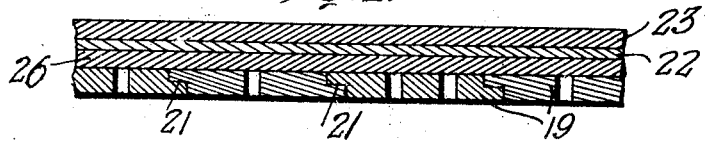

In the accompanying drawings, illustrating my invention, and forming a part of this specification, Figure 1 is a rear elevation showing the practical application of my invention, Fig. 2 is a partial transverse section, Fig. 3 is a detail perspective view of the shutter, Fig. 4 is a detail front view of one of the letter blocks, and, Fig. 5 is an elevation of a portion of the storage rack for the letter blocks.

Referring now to these figures, my invention proposes a camera attachment which consists of a frame 15 secured to the rear wall of a camera 16 and having a laterally extending slotted rack portion 17 at one end which projects across the rear face of the camera and is open at one end opposite a recessed portion 18 of the adjacent side wall of the camera to receive a series of letter and numeral blocks 19.

The rack portion 17 of the frame, is flanged along its other end and its two sides, the flanges being seen at 20 and the several blocks 19, one of which appears in detail in Fig. 4, are independent of one another, although each extends at its upper and lower edges beneath the flanges 20 and is provided along its side edges with oppositely facing rabbets 21 adapting the blocks to overlap one another at their sides for preventing passage of light through any portion of the series except where it is intended to pass. Certain of the blocks, utilized as spacers, may of course remain blank, while the other blocks have either letters or numerals, by means of which words, date, time of the exposure and position of the stop may be arranged in the racks, each letter and numeral being open as seen in Fig. 4, so that light may pass therethrough and through the film paper 22 onto the film 23 as seen in Fig. 2.

The frame 15 has a slot 24 therethrough, at right angles to the rack portion 17, which receives the outwardly projecting pin 25 of the shutter 26 slidable beneath the said frame and normally interposed beneath the rack 17.

The pin 25 of this shutter forms a handle and is grasped and the shutter shifted from beneath the rack 17 after the letter and numeral blocks have been placed in proper or desired relation and position in the rack 17 by passage through the camera recess at one end of the rack adjacent to its opening.

If desired, the letter blocks and numeral blocks may be stored in a case 27 as seen in Fig. 5 having a plurality of designated racks 28 for retaining a series of similarly lettered or numbered blocks in position for ready use, as duplicates are of course often required.

My invention thus supplies letters and numerals capable of uniform exposure and uniformly successful results after exposure, as well as an autographic attachment of simple inexpensive nature which will produce legible neat and pleasing data upon the negatives.

I claim:

1. The combination with a camera slotted at its rear and having a recess at one side of its slot, of a frame secured to the said rear of the camera and having a transversely extending rack open at one end opposite the said recess, a series of letter and numeral blocks movable in guided relation into the open end of the rack and having rabbeted overlapping side edges, and a shutter shiftable beneath the frame to and from a position beneath the rack and having manual controlling means projecting exteriorly through the frame.

2. The combination with a camera having a slotted rear wall, of a frame secured thereto to cover the slot and provided with a transversely extending rack open at one end, a plurality of letter and numeral blocks movable in guided relation within the rack and having overlapping portions at their abutting side edges, and a shutter shiftable beneath the frame to and from a position beneath the rack, for the purpose described.

3. The combination with a camera having a slotted rear wall, of a frame secured thereto to cover the slot and provided with a transversely extending rack open at one end, a plurality of blocks movable into said rack through its open end and having open slotted figures, and a shutter normally underlying the rack and having a manual controlling handle projecting exteriorly through a portion of the said frame for shifting the same from beneath the rack.

MALCOLM BOYD BOYCE.